Nov. 10, 1964 D. W. G. BYATT 3,156,916
RADIO DIRECTION FINDERS
Filed April 13, 1961
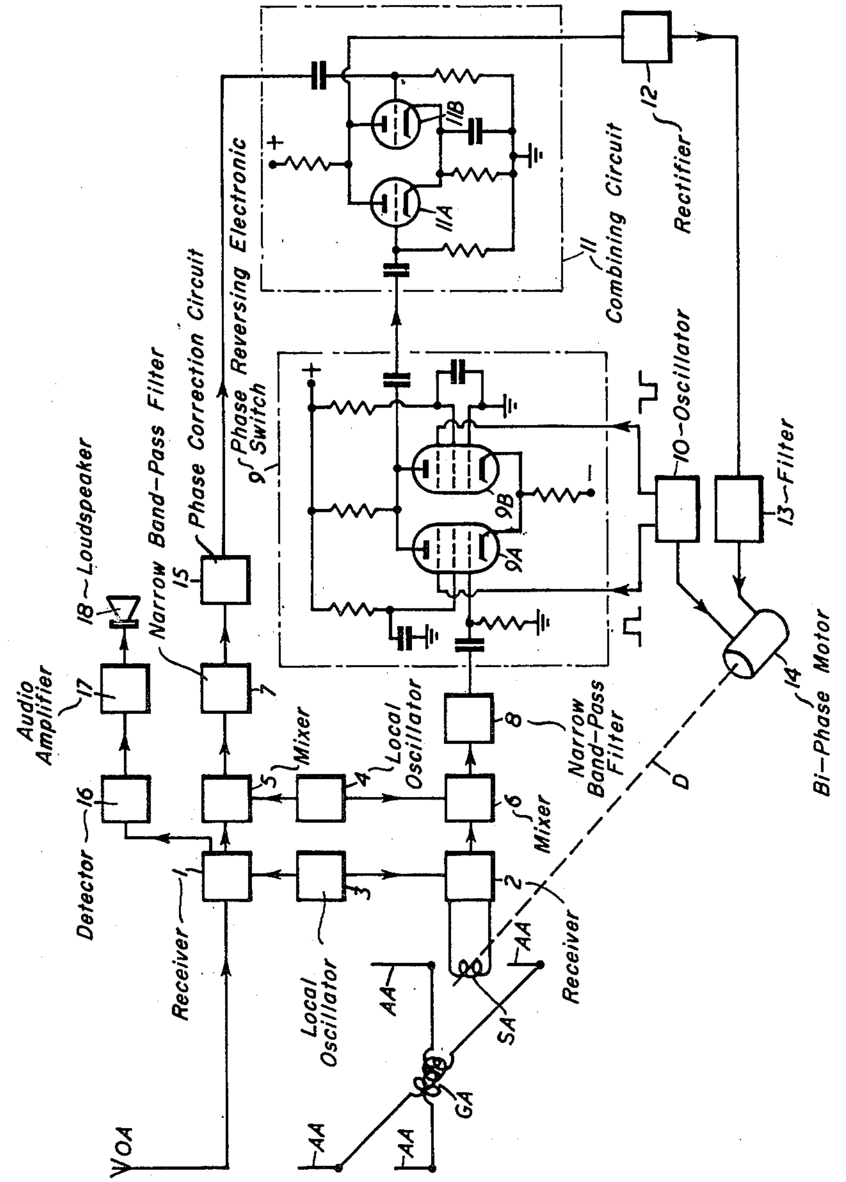
INVENTOR
Dennis William George Byatt
BY Baldwin & Wight
ATTORNEYS United States Patent Office 3,156,916

Patented Nov. 10, 1964

3,156,916
RADIO DIRECTION FINDERS

Dennis William George Byatt, Great Baddow, England, assignor to The Marconi Company Limited, a British company Filed Apr. 13, 1961, Ser. No. 102,817
Claims priority, application Great Britain, May 18, 1960, 17,545/60
5 Claims. (Cl. 343—117)

This invention relates to automatic radio direction finders and, though not limited to its application thereto, is particularly advantageously applicable to radio direction finders operating in the high frequency (H.F.) band.

Adjacent channel interference is a frequent source of trouble in radio direction finding, especially in the H.F. band. In the case of a manually operated direction finder an experienced operator, working with an aural or visual indicator, can often separate bearings from stations in adjacent channels, and adjacent channel interference effects, though troublesome, are not usually in practice as serious as they are with automatic direction finders. However, with automatic direction finders as at present known and in common use, wherein the receiver proper is preceded by a spinning goniometer or by some form of aerial switching, the receiver acceptance bandwidth must be large enough to pass several harmonics of the switching or spinning speed (as the case may be) and this, in practice, has to be fairly high, e.g. in the usual case of a direction finder adapted to receive interrupted continuous wave (I.C.W.) signals, the minimum switching or spinning speed permissible is determined by the highest speed I.C.W. signal to be received. Accordingly the acceptance band of the receiver has to be wide and adjacent channel interference is correspondingly serious. The present invention seeks to avoid this defect and to provide improved automatic radio direction finders of narrow effective bandwidth. As will be seen later an effective bandwidth of the order of only ±100 c./s. is readily attainable when carrying out the invention.

According to the invention an automatic radio direction finder comprises in combination substantially non-directional means for deriving a non-directional signal from an incoming radio wave; directional means of variable directivity for deriving from said incoming radio wave a directional signal dependent (inter alia) on the momentary directivity of said directional means; means for translating the non-directionally and directionally received signals into signals of the same relatively low frequency and lying within a relatively narrow frequency band; means for periodically reversing the phase of one of the resultant relatively low frequency signals thus produced; means for combining the periodically phase reversed relatively low frequency signals with the other low frequency signals in such manner that, when the former is of one phase the two signals combine additively and when it is of the other phase the said two signals combine subtractively; and means responsive to the result of combination for varying the directivity of said directional means of variable directivity.

According to a feature of this invention an automatic radio direction finder comprises in combination substantially non-directional means for deriving a non-directional signal from an incoming wave; directional means of variable directivity for deriving from said incoming radio wave a directional signal dependent (inter alia) on the momentary directivity of said directional means; means for translating the non-directionally and directionally received signals into signals of the same relatively low frequency; two relatively narrow band pass filters, one fed with one of said relatively low frequency signals and the other with the other; a source of switching frequency; means actuated by said source for periodically reversing in phase the output of the filter fed with the relatively low frequency signals derived from said directional means; means for combining the two filter outputs so that they add when the periodically reversed output is of one phase and subtract when it is of the other phase; means for rectifying the output from said combining means and extracting from the rectified resultant the component signal of said switching frequency present in said output; a motor having two phase windings and adapted to be driven by quadrature inputs fed thereto, said motor being arranged, when driven, to vary the directivity of said directional means; and means for feeding said phase windings in quadrature, one with the output from said switching frequency source and the other with the extracted component signal of switching frequency whereby said motor automatically varies said directivity until said component signal is brought substantially to zero amplitude.

The directional means may conveniently comprise an Adcock aerial system and a radio-goniometer the search member of which is rotated to vary the directivity.

In a preferred embodiment the periodic phase reversal is effected by a cathode coupled pair of pentodes, the suppressor electrodes of which are fed with oppositely phased voltages from a source of switching frequency so that said pentodes are switched on and off alternately.

Convenient practical values for the frequency of phase reversal and for the relatively low frequency are, respectively, 400 c./s. and 2 kc./s. The relatively narrow low frequency band within which the low frequency signals lie may, to quote a practical figure, have a bandwidth of ±100 c./s.

Preferably the translation of the directionally and non-directionally received signals to the relatively low frequency is effected by one or more frequency changers in each of the channels carrying the signals in question, corresponding frequency changes in the two channels having a common local oscillator.

The invention is illustrated in the accompanying drawing which is a diagram of one embodiment.

Referring to the drawing, OA is a omni-directional receiving aerial and AA are the four aerials of an Adcock directional system including a radio-goniometer with a rotatable search coil SA. The aerial OA feeds into a receiver 1 and the search coil SA into a second similar receiver 2. These two receivers are of the superheterodyne type and have associated therewith a common local oscillator 3. Each of the receivers feeds into a further frequency changing stage 5 or 6 both associated with a common beat frequency oscillator 4. The use of common local oscillators 3 and 4 in this manner minimises phase and frequency drift as between the two receiving channels. The output frequency from each of the two stages 5 and 6 is the same and is arranged to be a relatively low audio frequency, for example, 2 kc./s. These low frequency outputs are fed to narrow band pass filters 7 and 8 respectively which may have pass bands of, for example, 2 kc./s.±100 c./s. Up to the output terminals of the filters 7 and 8 the two signal channel paths, one from the open aerial and the other from the directional aerial system, are as nearly alike as possible.

The output from the filter 8 is fed to a phase reversing electronic switch in block 9. This switch is shown as consisting of a conventional arrangement of a pair of cathode-coupled pentodes 9A and 9B the suppressor electrodes of which are alternately switched on and off by phase opposed pulses as indicated conventionally and derived from a switching oscillator 10 of suitable frequency, e.g. 400 c./s. The switch operates in well known manner. When the suppressor grid of pentode 9A is switched off, the screen grid acts as an anode and the input to the switch is effective at the cathode of pentode 9B, the suppressor grid of which is, of course, switched on. The output of the unit 9 will be the same as the input thereto except that it is reversed in phase at twice the switching frequency. This periodically phase reversed output is fed as one input to a combining circuit 11 whose other input is derived from the filter 7 through a phase corrector circuit 15 of any known form and which is so adjusted that when one phase is present in the output from the unit 9 the two inputs to unit 11 combine additively and when the other phase is present the two inputs combine subtractively. The phase corrector 15 could, of course, be inserted at any other suitable point in either of the channels. Unit 11 is shown as consisting of a pair of valves 11A and 11B with a common cathode circuit and it is thought that its operation will be self-evident from the figure.

The output from unit 11 will consist of modulation upon the signal at the original switching frequency and this output is rectified by a rectifier 12 and fed to a filter 13 which filters out the switching frequency.

14 is a two-phase motor adapted to be driven by two quadrature inputs fed one to each phase winding. One of the quadrature inputs is a substantially sinusoidal input derived from the source 10 and the other is the separated switching frequency filtered out by the unit 13. The whole arrangement is such that the two inputs to the motor 14 are in quadrature. The motor drives the search coil SA as indicated conventionally by the chain line D. The said motor will accordingly automatically rotate the search coil in one direction or the other until it reaches the correct null position indicating the bearing of the incoming signal being received. If the direction of the input signal changes so that it is on the other side of the null the phase reversal that occurs across the null of the goniometer will cause the signal fed through the path comprising units 2–6–8–9–11–12–13 to reverse in phase and drive the motor in the opposite direction towards the new bearing.

The embodiment illustrated includes provision for continuously monitoring the incoming signal. This is done by taking output from the receiver 1 to a detector 16 followed by an audio amplifier 17 feeding into a loudspeaker, 18.

One particular advantage of the illustrated embodiment is that it is relatively tolerant of phase slip between the two signal channels, one of which starts at the open aerial and the other at the directional aerial system. A phase difference of 45° between the two inputs to the combining circuit 11 will in practice reduce the drive for the motor by about 2 db and a phase difference of 60° will reduce the drive by about 6 db. With a phase difference of 90°, of course, the drive disappears and, beyond this, bearing reversal occurs. The main advantage of the invention is, however, that it provides an automatic direction finder of narrow effective bandwidth so that adjacent channel interference is much reduced as compared to known comparable automatic direction finders of customary design and arrangement.

I claim:

1. An automatic radio direction finder comprising in combination substantially non-directional means for deriving a non-directional signal from an incoming radio wave; directional means of variable directivity for deriving from said incoming radio wave a directional signal dependent on the momentary directivity of said directional means; means for translating the non-directionally and directionally received signals into signals of the same relatively low frequency and lying within a relatively narrow frequency band; means for periodically reversing the phase of one of the resultant relatively low frequency signals thus produced; means for combining the periodically phase reversed relatively low frequency signals with the other low frequency singals in such manner that, when the former is of one phase the two signals combine additively and when it is of the other phase the said two signals combine subtractively; and means responsive to the result of combination for varying the directivity of said directional means of variable directivity.

2. An automatic radio direction finder comprising in combination substantially non-directional means for deriving a non-directional signal from an incoming wave; directional means of variable directivity for deriving from said incoming radio wave a directional signal dependent on the momentary directivity of said directional means; means for translating the non-directionally and directionally received signals into signals of the same relatively low frequency; two relatively narrow band pass filters, one fed with one of said relatively low frequency signals and the other with the other; a source of switching frequency; means actuated by said source for periodically reversing in phase the output of the filter fed with the relatively low frequency signals derived from said directional means, means for combining the two filter outputs so that they add when the periodically reversed output is of one phase and substract when it is of the other phase; means for rectifying the output from said combining means and extracting from the rectified resultant the component signal of said switching frequency present in said output; a motor having two phase windings and adapted to be driven by quadrature inputs fed thereto, said motor being arranged, when driven, to vary the directivity of said directional means; and means for feeding said phase windings in quadrature, one with output from said switching frequency source and the other with the extracted component signal of switching frequency whereby said motor automatically varies said directivity until said component signal is brought substantially to zero amplitude.

3. An automatic radio direction finder as claimed in claim 1 wherein the directional means comprise an Adcock aerial system and a radio-goniometer the search member of which is rotated to vary the directivity.

4. An automatic radio direction finder as claimed in claim 1 wherein the means for periodically reversing the phase of one of the resultant relatively low frequency signals comprises a cathode coupled pair of pentodes and a source of switching frequency, the source being connected to feed oppositely phased voltages to the suppressor electrodes of the pair of pentodes so that said pentodes are switched on and off alternately.

5. An automatic radio direction finder as claimed in claim 1 wherein the translation of the directionally and non-directionally received signals to the relatively low frequency is effected by at least one frequency changer in each of the channels carrying the signals in question, corresponding frequency changers in the two channels having a common local oscillator.

References Cited by the Examiner

UNITED STATES PATENTS 2,489,270 11/49 Cole ---------------- 343—117

KATHLEEN H. CLAFFY, *Primary Examiner.*

CHESTER L. JUSTUS, *Examiner.*